United States Patent [19]

Yano

[11] Patent Number: 5,331,462
[45] Date of Patent: Jul. 19, 1994

[54] ZOOM LENS HAVING A LONG BACK FOCAL LENGTH

[75] Inventor: Koutaro Yano, Yokohama, Japan

[73] Assignee: Canon Kabushiki Kaisha, Tokyo, Japan

[21] Appl. No.: 788,285

[22] Filed: Nov. 5, 1991

[30] Foreign Application Priority Data

Nov. 8, 1990 [JP] Japan ............................ 2-303011

[51] Int. Cl.$^5$ ...................... G02B 15/14; G02B 13/18; G02B 9/12
[52] U.S. Cl. .................................. 359/689; 359/651; 359/716; 359/784
[58] Field of Search .............................. 359/648–651, 359/676, 680, 682, 689–692, 708, 716, 728, 745, 748, 749, 783, 784

[56] References Cited

U.S. PATENT DOCUMENTS

| | | | |
|---|---|---|---|
| 3,663,095 | 5/1972 | Mori | 359/749 |
| 3,832,035 | 7/1974 | Takahashi | 359/708 |
| 3,992,085 | 11/1976 | Momiyama | 359/708 |
| 4,111,558 | 9/1978 | Ikemori | 359/708 |
| 4,310,222 | 1/1982 | Ikemori | 389/709 |

FOREIGN PATENT DOCUMENTS

54-139725 10/1979 Japan.
314613 6/1991 Japan.

Primary Examiner—Bruce Y. Arnold
Assistant Examiner—Darryl Collins
Attorney, Agent, or Firm—Fitzpatrick, Cella, Harper & Scinto

[57] ABSTRACT

In a retro-focus type lens divided into three lens units by the widest air spacing and the next widest air spacing, a first lens unit is disposed on a long conjugate side and has negative refractive power, and includes a negative lens and a lens provided with an aspherical surface, a second lens unit is disposed subsequently to the first lens unit and provided with a positive lens block, and a third lens unit is disposed subsequently to the second lens unit and has positive refractive power, and includes a negative lens and a positive lens.

16 Claims, 6 Drawing Sheets

ZOOM LENS HAVING A LONG BACK FOCAL LENGTH

BACKGROUND OF THE INVENTION

1. Field of the Invention

This invention relates to a retro-focus (reverse telephoto) type lens, and particularly to a retro-focus type lens suitable, for example, as a projection lens for a color liquid crystal projection TV set designed such that a plurality of images having different kinds of color information are synthesized by a synthesizing mirror and thereafter enlargedly projected onto a screen surface.

2. Related Background Art

There have heretofore been proposed various color liquid crystal projection type TV sets designed such that images being displayed on a plurality of color liquid crystals (liquid crystal light bulbs) are optically superposed one upon another and projected onto a screen surface by a projection lens.

FIG. 9 of the accompanying drawings shows an assembly of the essential portions of a color liquid crystal projection TV set in which images formed on popular color liquid crystals are projected onto a screen surface S.

In FIG. 9, the reference numeral 1 designates a white light source emitting a collimated light beam. The reference characters 2a, 2b and 2c denote liquid crystal display elements for red, green and blue, respectively. Projected images are displayed on these liquid crystal display elements. The reference characters 3a and 3b designate ordinary mirrors, and the reference numeral 4 denotes a red reflecting dichroic mirror. Red light illuminates the liquid crystal display element 2a for red. The reference numeral 5 designates a green reflecting dichroic mirror. Green light illuminates the liquid crystal display element 2b for green.

The liquid crystal display element 2c for blue is illuminated by blue light passed through the red reflecting dichroic mirror 4 and the green reflecting dichroic mirror 5. The reference numeral 6 denotes a blue transmitting dichroic mirror. The reference numeral 7 designates a projection lens.

In FIG. 9, the white light from the white light source 1 is color-resolved into red, green and blue color lights by the dichroic mirrors 4 and 5, the liquid crystal display elements 2a, 2b and 2c for red, green and blue are illuminated by these red, green and blue color lights, respectively, and the images of the liquid crystal display elements 2a, 2b and 2c based on these color lights are superposed on the screen surface by the projection lens 7, whereby a color image is obtained.

From the necessity of disposing various kinds of optical members such as reflecting mirrors and dichroic mirrors between the last lens surface to the liquid crystal display elements (the back focal length), a retro-focus type lens having a long back focal length is often used as the projection lens in such a construction.

Generally, a retro-focus type lens comprises a lens construction in which a lens unit of negative refractive power is disposed on the object side (the conjugate point side having a long distance) and a lens unit of positive refractive power is disposed on the image plane side (the conjugate point side having a short distance). This leads to the feature that a relatively long back focal length can be easily obtained.

However, the lens construction is asymmetrical, and this leads to the tendency that asymmetrical aberrations such as distortion and astigmatism are much created.

Where a retro-focus type lens is used in a color liquid crystal projection TV set, a color resolving dichroic mirror is disposed on the image plane side as shown in FIG. 9 and therefore, to eliminate color irregularity and effect the color reproduction of the entire picture plane well, it is necessary that the angle of incidence of the light beam onto the dichroic mirror be made substantially equal over the entire picture plane. That is, it is necessary that the lens system be brought into a state approximate to that of a so-called emergence telecentric system in which a chief ray emerging to the image plane side becomes substantially parallel to the optical axis.

However, if the lens system is made into an emergence telecentric system, the off-axial light beam will come to enter the lens unit of positive refractive power on the image plane side at a high position from the optic axis. This gives rise to the problem that barrel type (negative) distortion and flare are much created and it is very difficult to obtain a good projected image.

So, the applicant has previously proposed in Japanese Patent Application No. 1-286058 (Laid-Open No. 3-145613) a retro-focus type lens having a lens construction approximate to an emergence telecentric system suitable as a projection lens for a color liquid crystal projection TV set in which the lens construction is set appropriately, whereby the above-mentioned aberrations such as distortion and flare are corrected well.

Japanese Laid-Open Patent Application No. 54-139725 is known as a retro-focus type photographic lens provided with an aspherical surface.

SUMMARY OF THE INVENTION

It is an object of the present invention to further improve the retro-focus type lens previously proposed by the assignee and to provide a retro-focus type lens suitable as a projection lens for a color liquid crystal projection TV set in which the number of lenses is reduced and yet a predetermined back focal length is easily obtained and moreover aberrations such as distortion and flare are corrected well.

It is a second object of the present invention to provide a retro-focus type lens in which with the widest lens spacing and the next widest lens spacing as boundaries, a first lens unit of negative refractive power, a second lens unit of positive refractive power and a third lens unit of positive refractive power are arranged in succession from a longer first conjugate side, said first lens unit having at least one negative lens and an aspherical lens provided with an aspherical surface on at least one surface thereof, said second lens unit having at least one positive lens, said third lens unit having at least one positive lens and at least one negative lens.

It is a third object of the present invention to provide a retro-focus type lens in which the aspherical lens of said first lens unit is provided with an aspherical surface on the lens surface thereof which is adjacent to a first conjugate point and satisfies the following condition:

$$B1 > 0, \tag{a1}$$

where B1 is the quartic aspherical coefficient of said aspherical surface, or said aspherical lens is provided with aspherical surfaces on the lens surfaces thereof which are adjacent to the first conjugate point and a second conjugate point, respectively, and satisfies the following condition:

$$B1 > B2, \quad (a2)$$

where B1 and B2 are the quartic aspherical coefficients of said aspherical surfaces which are adjacent to said first conjugate point and said second conjugate point, respectively.

DESCRIPTION OF THE PREFERRED EMBODIMENTS

Figure 1:
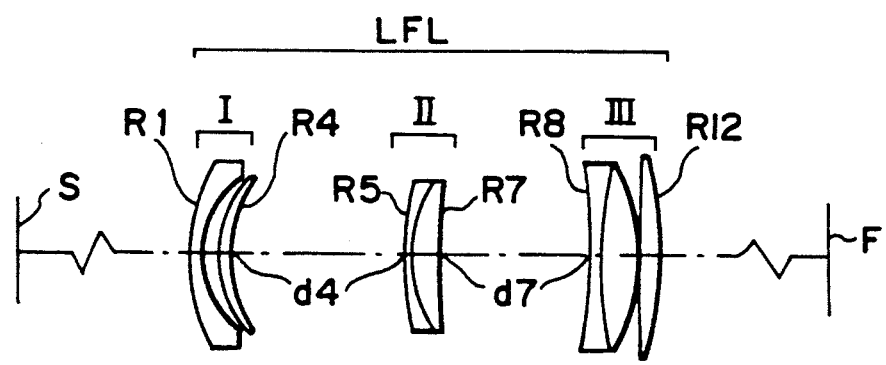
FIG. 1 is a cross-sectional view of a lens showing a first embodiment of the present invention.
Figure 2:
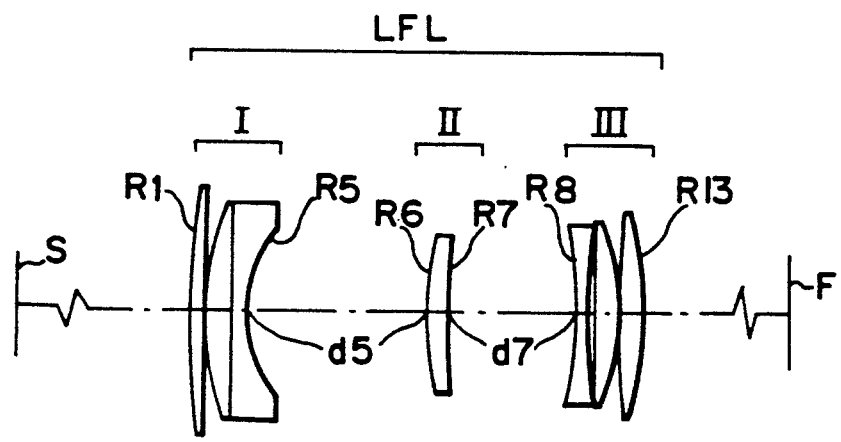
FIG. 2 is a cross-sectional view of a lens showing a second embodiment of the present invention.
Figure 3:
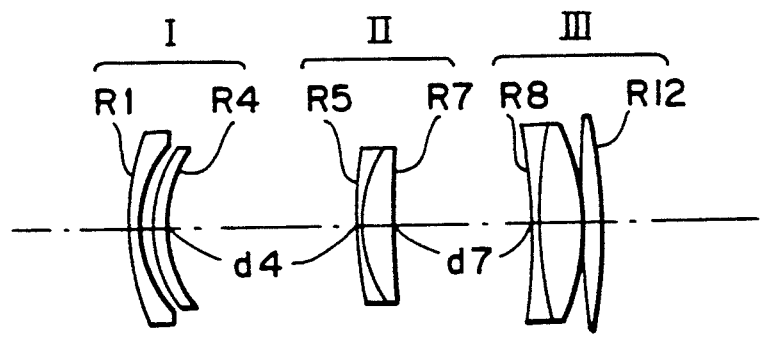
FIG. 3 is a cross-sectional view of a lens showing a third embodiment of the present invention.
Figure 4:
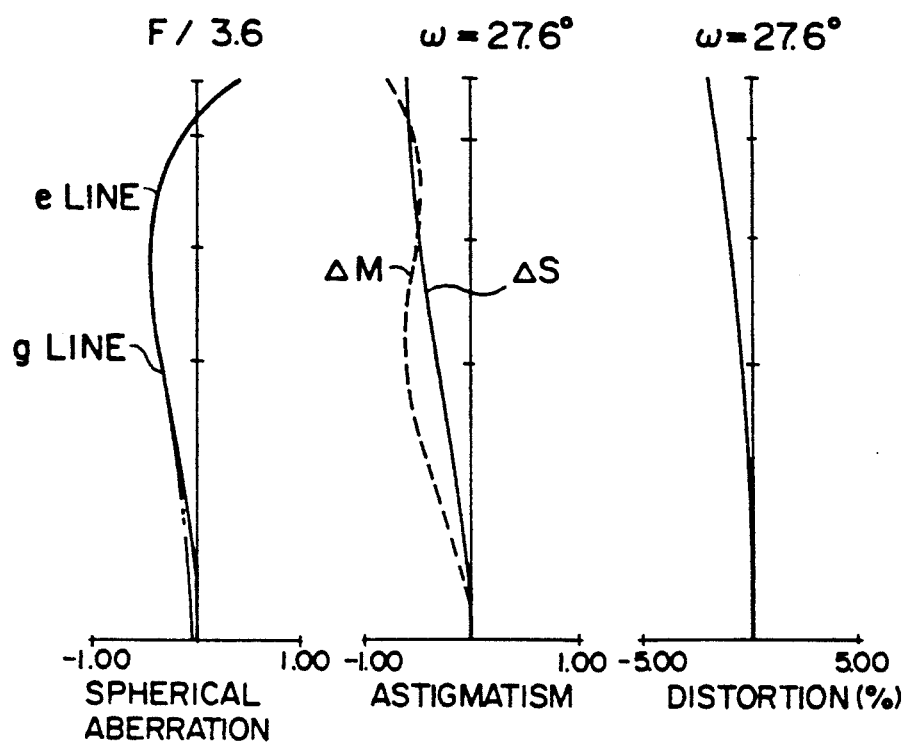
FIG. 4 is an aberration graph on a short conjugate surface regarding the long conjugate distance 1.5 m of the first embodiment.
Figure 5:
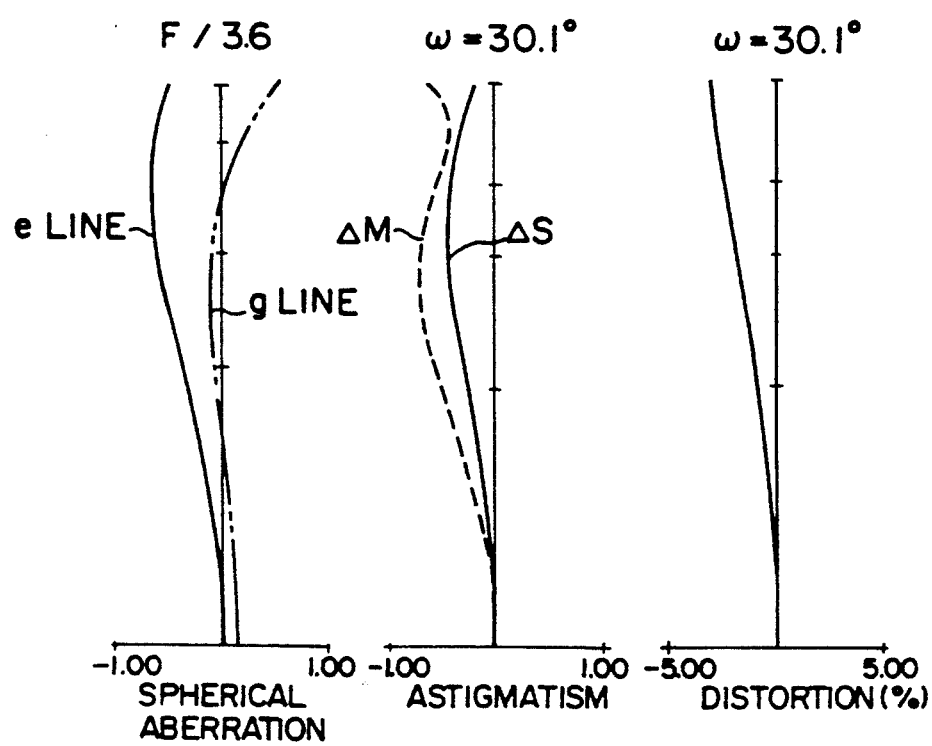
FIG. 5 is an aberration graph on a short conjugate surface regarding the distance 1.5 m of the second embodiment.
Figure 6:
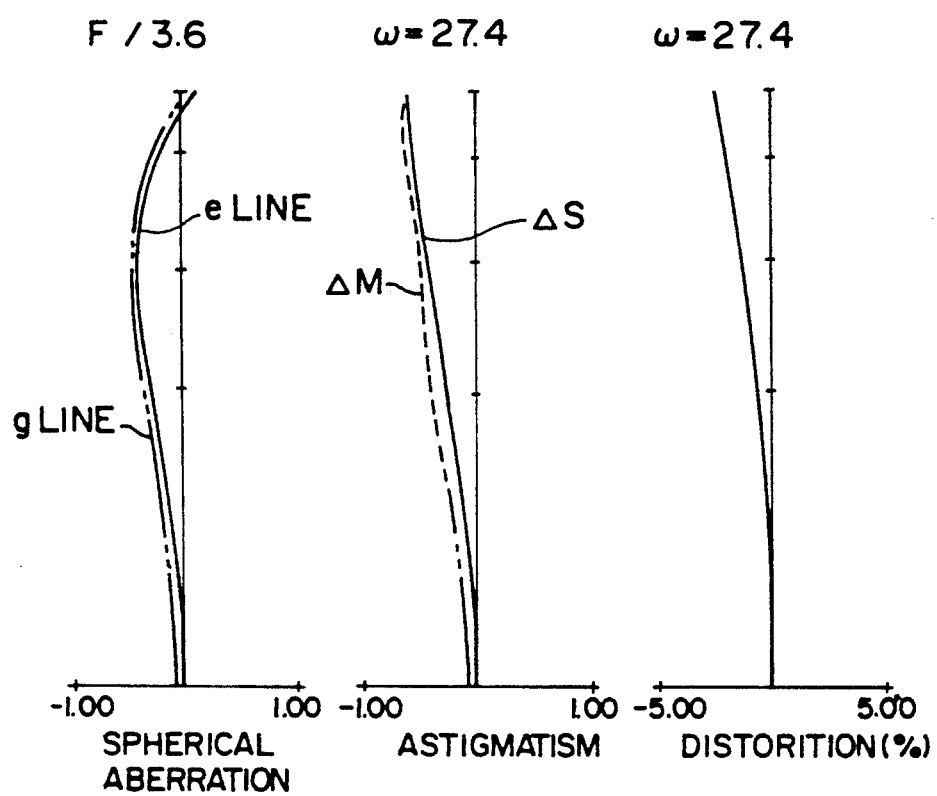
FIG. 6 is an aberration graph on a short conjugate surface regarding the distance 3 m of the third embodiment.

FIGS. 1, 2 and 3 are cross-sectional views of lenses corresponding to lens data 1-3 which will be described later, and also show portions thereof with the application of the present invention to a projection lens taken as an example.

Figure 9:
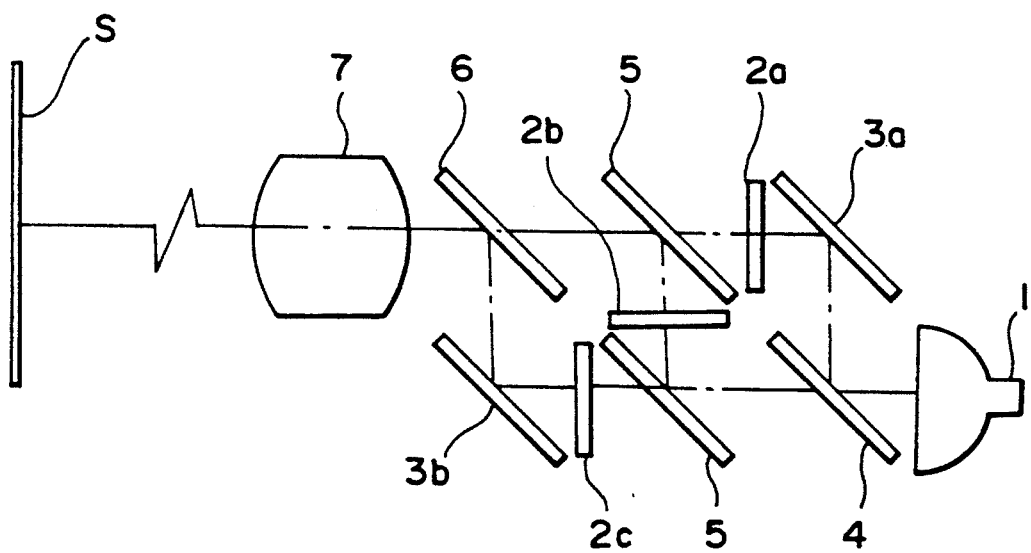
FIG. 9 shows the optical arrangement of a liquid crystal projection color TV set.

In these figures, LFL designates the retro-focus type lens of the present invention. S denotes a screen disposed on a first conjugate point side of long distance (which corresponds to the "object side" of an ordinary photo-taking lens). F designates a surface to be projected disposed on a second conjugate point side of short distance (which corresponds to the "image plane side" of an ordinary photo-taking lens). For example, in the case of the color liquid crystal projection as shown in FIG. 9, elements such as a liquid crystal display element which is a projected image, a light source and a filter are disposed on the image plane side. In FIGS. 1 and 3, $R_1$, $R_4$, $R_5$, $R_7$, $R_8$ and $R_{12}$ are directed to a frontmost lens surface of a first unit I, a rearmost lens surface of a first unit I, a frontmost lens surface of a second unit II, a rearmost lens surface of a second unit II, a frontmost lens surface of a third unit III and a rearmost lens surface of a third unit III, respectively.

Further, $d_4$ and $d_7$ in FIGS. 1 and 3 are directed to an interval between a first unit I and a second unit II and an interval between a second unit II and third unit III, respectively.

In FIG. 2, $R_1$, $R_5$, $R_6$, $R_7$, $R_8$ and $R_{13}$ are directed to a frontmost lens surface of a first unit I, a rearmost lens surface of a first unit I, a frontmost lens surface of a second unit II, a rearmost lens surface of a second unit II, a frontmost lens surface of a third unit III and a rearmost lens surface of a third unit III, respectively.

Further, $d_5$ and $d_7$ in FIG. 2 are directed to an interval between a first unit I and a second unit II and an interval between a second unit II and third unit III, respectively.

I denotes a first unit of negative refractive power, II designates a second unit of positive refractive power, and III denotes a third unit of positive refractive power. These lenses are divided into three lens units in succession from the object side with respect to the widest air spacing and the next widest air spacing between adjacent lens units as the basis.

In this retro-focus type lens, the refractive power, the lens shape, etc. of each of the lens units constituting the first to third units are appropriately set and the retro-focus type is formed in such a manner that a lens unit of negative refractive power (the first unit) is disposed on the first conjugate point side and a lens unit of positive refractive power (the third unit) is positioned on the second conjugate point side, whereby a back focal length of a predetermined length is effectively secured. At this time, aspherical aberration is much created from the lens unit of positive refractive power (the third unit) and therefore, the second unit of positive refractive power is disposed between the first unit and the third unit, whereby the amount of spherical aberration created is reduced.

Also, at least one aspherical lens provided with an aspherical surface on at least one lens surface thereof is disposed in the first unit, whereby aberrations such as distortion and flare are corrected well and a projected image of high optical performance is obtained.

Figure 7:
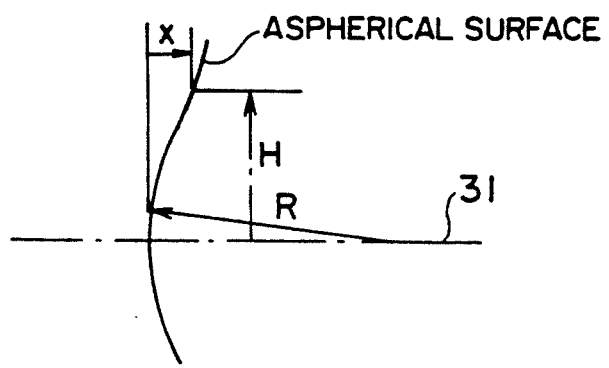
FIG. 7 is an illustration of an aspherical surface.
Figure 8:
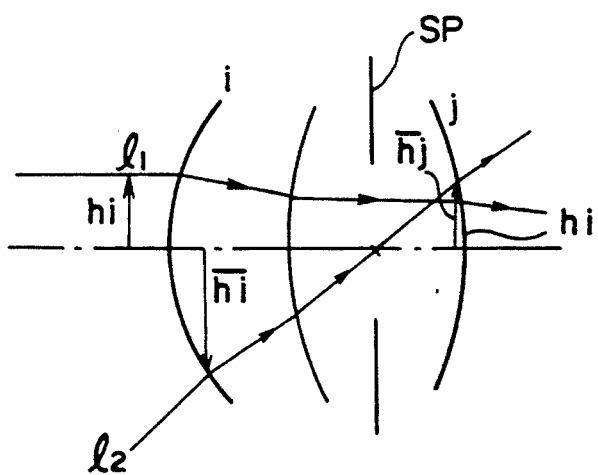
FIG. 8 shows the relations of an on-axial ray and an off-axial ray to the surfaces of a lens.

The aspherical shape of the aforedescribed aspherical surface specifies an aspherical shape as shown in FIG. 7. That is, the paraxial radius of curvature of the lens surface at the vertex on the optical axis of the lens is R, X-axis is taken on the optical axis in the direction from the first conjugate point side of long distance toward the second conjugate point side of short distance (from the object side toward the image plane side), H-axis is taken through the vertex of the lens surface and in a direction perpendicular to the X-axis, and with B, C, D and E as respective aspherical coefficients, the aspherical surface is expressed by the following equation:

$$X = \frac{(1/R)H^2}{1 + \sqrt{1 - (H/R)^2}} + BH^4 + CH^6 + DH^8 + EH^{10} \quad (1)$$

In this equation (1) expressing the aspherical shape, the second and subsequent terms give the amount of aspherical surface, and the coefficient of the second term, i.e., the quartic aspherical coefficient B, satisfies the following relational expression with a tertiary aspherical aberration coefficient $\psi$:

$$\psi = 8(N' - N)B \quad (2)$$

(where N' and N are the refractive indices of the medium on the object side and the image plane side, respectively, of the lens surface.)

Further, the aspherical aberration coefficient $\psi$ brings the following amounts of variation, i.e., the amounts of variation in the tertiary aberration created by the lens being made aspherical, to the tertiary aberration coefficient:

$$\left.\begin{array}{l} \Delta I = h^4 \psi \\ \Delta II = h^3 \bar{h} \psi \\ \Delta III = h^2 \bar{h}^2 \psi \\ \Delta V = h \bar{h}^3 \psi \end{array}\right\} \quad (3)$$

where I represents the spherical aberration coefficient, II represents the coma coefficient, III represents the astigmatism coefficient, and V represents the distortion coefficient.

Also, h and $\bar{h}$ are amounts of pursuit of paraxial ray, and h is indicative of the height (the distance from the optical axis) at which a ray travelling along the optical axis and imaged on the optical axis (a paraxial on-axial ray $l_1$) intersects each lens surface, and $\bar{h}$ is indicative of the height at which a ray entering each lens surface from an oblique direction and passing through the center of the pupil stop (Sp) (the position at which the central ray of the off-axial light beam intersects the optical axis) intersects each lens surface.

Now, to effectively correct by the aspherical surface the barrel type distortion and over astigmatism created in the first unit, in the expression (3) showing the amounts of variation in the tertiary aberration coefficient, $\Delta V$ and $\Delta III$ may be as follows:

$$\Delta V = h \bar{h}^3 \psi > 0 \quad (4)$$

$$\Delta III = h^2 \bar{h}^2 \psi > 0 \quad (5)$$

Here, in the first unit, $h > 0$ and $\bar{h} < 0$ therefore, $\psi$ may be as follows:

$$\psi > 0 \quad (6)$$

From equation (2), it follows that when the quartic aspherical coefficients of aspherical surfaces when aspherical surfaces are provided on both lens surfaces are B1 and B2 in succession from the object side, the tertiary aspherical aberration coefficient $\psi$ in the aspherical lens in the first unit is $$\psi = 8(NAL - 1) \cdot (B_1 - B_2), \quad (7)$$

(where NAL is the refractive index of the material of the aspherical lens.) However, when an aspherical surface is provided only on one surface, $B_2 = 0$.

From expressions (6) and (7), when an aspherical surface is provided on one surface, B1 is set to $$B1 > 0$$

as shown in the aforementioned expression (a1), and when aspherical surfaces are provided on both lens surfaces, B1 and B2 are set to $$B1 > B2$$

as shown in the aforementioned expression (a2), whereby aberration correction is done effectively.

Also, in the present embodiment, to secure a back focal length of a predetermined length and yet maintain the optical performance of the entire projection picture plane well-balancedly, it is preferable to set each lens unit as follows.

For example, as shown in FIG. 1, the projection lens is such that in succession from the first conjugate point side, the first unit has a meniscus-shaped negative lens having its convex surface facing the first conjugate point side and an aspherical lens provided with an aspherical surface on at least one surface thereof, the second unit has a positive doublet lens comprising a negative lens and a positive lens cemented together, and the third unit has a meniscus-shaped positive doublet comprising a negative lens and a positive lens cemented together and having its convex surface facing the second conjugate point side as a whole, and a positive lens.

Or as shown in FIG. 2, in succession from the first conjugate point side, the first unit has an aspherical lens provided with an aspherical surface on at least one surface thereof and a meniscus-shaped negative doublet lens comprising a positive lens and a negative lens cemented together and having its convex surface facing the first conjugate point side as a whole, the second unit has a positive lens, and the third unit has a negative lens whose both lens surfaces are concave surface and two positive lens.

Further, in the present embodiment, when the focal length of the aspherical lens in the first unit is fAL and the focal length of the entire system is fT, it is preferable to satisfy the following condition:

$$|fAL| > 3fT \quad (a3)$$

Conditional expression (a3) is for preventing the refractive index of the material of the aspherical lens from being varied by an environmental change such as a temperature change to deteriorate focus movement and optical performance when the aspherical lens is made, for example, of a plastic material or the like by molding.

That is, by providing a lens of relatively small refractive power (power) which will satisfy conditional expression (a3) with an aspherical surface, a predetermined optical performance is maintained and yet the deterioration of the optical performance by any environmental change is effectively prevented.

In the present embodiment, in order to keep the back focal length SK long and achieve a compact lens system, design is made to satisfy the following conditions:

$$f_1 < 0, f_{23} > 0,$$

where $f_1$ is the focal length of the first unit, and $f_{23}$ is the focal length of a composite lens (hereinafter referred to also as the "rear unit") comprising the second unit and the third unit.

If at this time, the principal point spacing between the first unit and the rear unit is e, the back focal length SK of the thin-walled system is $$SK = (1 - e/f_1) \cdot f_{23}. \quad (8)$$

In the present embodiment, to achieve a lens system in which the back focal length SK is long and which is moreover compact (that is, the principal point spacing e is small), it is preferable that the absolute value $|f_1|$ of the focal length of the first unit be as small as possible. However, if the value $|f_151|$ becomes too small, barrel type distortion will be greatly created on the image plane side from the first unit and astigmatism will also be greatly created on the over side and it will become difficult to maintain a good optical performance.

So, in the present embodiment, design is made to satisfy the following expression:

$$0.5 < |f_1/f_{23}| > 2.0 \quad (a4)$$

Also, in the present embodiment, when the center of the off-axial light beam is the principal ray, each element is set so that the angle $\theta$ formed by the principal ray of the greatest off-axial light beam emerging from the lens surface adjacent to the image plane side with respect to the optical axis may be $\theta < 20$ degrees. That is, when the height from the optical axis at which the principal ray of the greatest off-axial light beam emerges from the lens surface adjacent to the image plane side is h and the maximum image height on the image plane is D and the back focal length is SK, design is made to satisfy the following conditional expression:

$$(D-h)/SK < 0.364 \quad (a5)$$

Thereby, a predetermined telecetric system is provided.

Some numerical value examples of the present invention will be shown below. In the numerical value examples below, Ri is the radius of curvature of the ith lens surface from the object side, Di is the thickness and air spacing of the ith lens from the object side, and Ni and $\nu$i are the refractive index and Abbe number, respectively, of the glass of the ith lens from the object side. The aspherical coefficients are represented on the basis of the aforementioned equation (1).

Also, the relations between the aforementioned conditional expressions and the numerical value examples are shown in Table 1.

| Numerical Value Example 1 | | | |
|---|---|---|---|
| F = 86.1 | FNo = 1:3.6 | 2ω = 54.2° | |
| R1 = 58.78 | D1 = 3.00 | N1 = 1.69680 | ν1 = 55.5 |
| R2 = 27.83 | D2 = 4.62 | | |
| R3 = 37.45 | D3 = 3.50 | N2 = 1.49100 | ν2 = 57.0 |
| R4 = 37.42 | D4 = 49.28 | | |
| R5 = 93.21 | D5 = 2.50 | N3 = 1.77250 | ν3 = 49.6 |
| R6 = 42.14 | D6 = 7.44 | N4 = 1.69895 | ν4 = 30.1 |
| R7 = 245.08 | D7 = 42.17 | | |
| R8 = −188.77 | D8 = 3.00 | N5 = 1.84666 | ν5 = 23.9 |
| R9 = 136.81 | D9 = 10.20 | N6 = 1.51633 | ν6 = 64.2 |
| R10 = −64.42 | D10 = 0.20 | | |
| R11 = 492.26 | D11 = 6.18 | N7 = 1.69680 | ν7 = 55.5 |
| R12 = −124.36 | | | |

| Aspherical coefficients | | |
|---|---|---|
| R3 surface | B3 = 2.727 × 10⁻⁶ | C3 = 3.461 × 10⁻⁹ |
| | D3 = −3.478 × 10⁻¹² | E3 = 1.199 × 10⁻¹⁴ |
| | SK = 187.24 | |

| Numerical Value Example 2 | | | |
|---|---|---|---|
| F = 94.8 | FNo = 1:3.6 | 2ω = 60.2° | |
| R1 = 362.72 | D1 = 4.00 | N1 = 1.49171 | ν1 = 57.4 |
| R2 = 2049.02 | D2 = 0.50 | | |
| R3 = 92.64 | D3 = 7.58 | N2 = 1.69895 | ν2 = 30.1 |
| R4 = −886.10 | D4 = 3.50 | | |
| R5 = 34.62 | D5 = 51.38 | N3 = 1.77250 | ν3 = 49.6 |
| R6 = 99.46 | D6 = 6.55 | N4 = 1.59270 | ν4 = 35.3 |
| R7 = 579.22 | D7 = 34.85 | | |
| R8 = −143.31 | D8 = 4.00 | N5 = 1.84666 | ν5 = 23.9 |
| R9 = 274.38 | D9 = 1.74 | | |
| R10 = −569.61 | D10 = 6.70 | N6 = 1.60311 | ν6 = 60.7 |
| R11 = −67.48 | D11 = 0.20 | | |
| R12 = −510.54 | D12 = 7.07 | N7 = 1.69680 | ν7 = 55.5 |
| R13 = −101.42 | | | |

| Aspherical coefficients | | |
|---|---|---|
| R1 surface | B1 = 4.615 × 10⁻⁷ | C1 = −3.555 × 10⁻¹¹ |
| | D1 = −7.660 × 10⁻¹⁴ | E1 = 4.150 × 10⁻¹⁷ |

| Numerical Value Example 3 | | | |
|---|---|---|---|
| F = 86.7 | FNo = 1:3.6 | 2ω = 54.8° | |
| R1 = 65.765 | D1 = 3.00 | N1 = 1.69680 | ν1 = 55.5 |
| R2 = 31.683 | D2 = 4.62 | | |
| R3 = 40.253 | D3 = 3.50 | N2 = 1.49100 | ν2 = 57.0 |
| R4 = 36.112 | D4 = 54.67 | | |
| R5 = 93.349 | D5 = 2.50 | N3 = 1.77250 | ν3 = 49.6 |
| R6 = 42.261 | D6 = 8.36 | N4 = 1.69895 | ν4 = 30.1 |
| R7 = 291.608 | D7 = 39.11 | | |
| R8 = −185.799 | D8 = 3.00 | N5 = 1.84666 | ν5 = 23.9 |
| R9 = 123.129 | D9 = 12.91 | N6 = 1.51633 | ν6 = 64.2 |
| R10 = −66.397 | D10 = 0.20 | | |
| R11 = 463.509 | D11 = 5.59 | N7 = 1.69680 | ν7 = 55.5 |
| R12 = −130.110 | | | |

| Aspherical coefficients | | |
|---|---|---|
| R3 surface | B3 = 1.6256 × 10⁻⁶ | C3 = 6.4150 × 10⁻¹⁰ |
| | D3 = 9.2803 × 10⁻¹³ | E3 = 1.7493 × 10⁻¹⁵ |
| R4 surface | B4 = −3.9349 × 10⁻⁷ | C4 = −1.0668 × 10⁻⁹ |
| | D4 = 1.2718 × 10⁻¹² | E4 = −1.2618 × 10⁻¹⁵ |

TABLE 1

| Conditional Expressions | Numerical Value Examples | | |
|---|---|---|---|
| | 1 | 2 | 3 |
| \|fAL\|/fT | 29.36 | 9.405 | 11.39 |
| \|f1/f23\| | 0.817 | 0.867 | 0.818 |
| (D − h)/SK | 0.15 | 0.20 | 0.14 |

According to the present invention, by setting the lens construction as previously described, there can be achieved a retro-focus type lens suitable as a projection lens for a color liquid crystal projection TV set in which aberrations such as distortion and flare are effectively corrected by a relatively small number of lenses and which has a high optical performance and a long back focal length.

Also, according to the present invention, by setting the refractive power of an aspherical lens provided with an aspherical surface as previously described, there can be achieved a retro-focus type lens characterized in that the focus movement by a temperature change or the like when the lens is constructed of a lens molded from plastics such as acryl, can be effectively prevented and the light weight of the entire lens system can be achieved.

What is claimed is:

1. In a retro-focus type lens system divided into three lens units with respect to the widest air spacing and the next widest air spacing between adjacent lens units, the improvement comprising:

a first lens unit disposed on a long conjugate side and having negative refractive power, and including a negative lens and a lens provided with an aspherical surface;

a second lens unit disposed subsequently to said first lens unit and provided with a positive lens block; and a third lens unit disposed subsequently to said second lens unit and having a positive refractive power, and including a negative lens and a positive lens, wherein both the interval between the first and second lens units and the interval between the second and third lens units are larger than the interval between a foremost lens surface and a rearmost lens surface within each of the three lens units.

2. A retro-focus type lens according to claim 1, wherein said first lens unit has a meniscus-shaped negative lens having its convex surface facing a first conjugate point side and an aspherical lens provided with an aspherical surface on at least one surface thereof, said second lens unit has a positive lens unit comprising a negative lens and a positive lens cemented together, and said third lens unit has a meniscus-shaped positive doublet lens comprising a negative lens and a positive lens cemented together and having its convex surface facing a short conjugate side as a whole and a positive lens.

3. A retro-focus type lens according to claim 1, wherein said first lens unit has an aspherical lens provided with an aspherical surface on at least one surface thereof and a meniscus-shaped negative doublet lens comprising a positive lens and a negative lens cemented together and having its convex surface facing a long conjugate side as a whole, said second lens unit has a positive lens, and said third lens unit has a negative lens whose both lens surfaces are concave surfaces and two positive lenses.

4. A retro-focus type lens according to claim 1, wherein the aspherical lens of said first lens unit is provided with an aspherical surface on the lens surface thereof which is adjacent to a long conjugate side, and when the quartic aspherical coefficient of said aspherical surface is B1, it satisfies the condition that $B1 > 0,$ provided that the shape of the aspherical surface is expressed by the following equation:

$$X = \frac{(1/R)H^2}{1 + \sqrt{1 - (H/R)^2}} + BH^4 + CH^6 + \ldots$$

5. A retro-focus type lens according to claim 1, wherein the aspherical lens of said first lens unit is provided with aspherical surfaces on both lens surfaces thereof, and the quartic aspherical coefficients of the aspherical surfaces which are adjacent to a first conjugate point side and a second conjugate point side, respectively, are B1 and B2, it satisfies the condition that $B1 > B2,$ provided that the shape of the aspherical surfaces is expressed by the following equation:

$$X = \frac{(1/R)H^2}{1 + \sqrt{1 - (H/R)^2}} + BH^4 + CH^6 + \ldots$$

6. A retro-focus type lens according to claim 1, which satisfies the condition that $|fAL| > 3fT,$ where fAL is the focal length of the aspherical lens of said first lens unit, and fT is the focal length of the entire system.

7. A retro-focus lens system according to claim 1, wherein said second lens unit further comprises a positive lens block that is a positive lens or a doublet lens.

8. A retro-focus lens system according to claim 1, wherein the optical system satisfies the condition:

$0.5 < |f_1/f_{23}| < 2.0$ wherein $f_1$ is focal length of said first lens unit and $f_{23}$ is the synthetic focal length of said second and third lens units.

9. A retro-focus lens system according to claim 1, wherein assuming a light flux is projected from the long conjugate side, the optical system satisfies the condition:

$(D-h)/SK < 0.364$ wherein D is a maximum image height at an imaging plane, h is the height of a chief ray of the maximum off-axial light flux over the optical axis when the chief ray emerges from a rearmost lens adjacent to the imaging plane and SK is a back focal length.

10. In a retro-focus type lens system divided into three lens units with respect to the widest air spacing and the next widest air spacing between adjacent lens units, and improvement comprising:
a first lens unit disposed on a long conjugate side and having negative refractive power, and including a negative lens and lens provided with an aspherical surface, wherein further said first lens unit has a meniscus-shaped negative lens having its convex surface facing said long conjugate side and an aspherical lens provided with an aspherical surface on at least one surface thereof;
a second lens unit disposed subsequently to said first lens unit and provided with a positive lens block comprising a negative lens and a positive lens cemented together; and
a third lens unit disposed subsequently to said second lens unit and having a positive refractive power, and said third lens unit further comprises a meniscus-shaped positive doublet lens comprising a negative lens and positive lens cemented together and having its convex surface facing a short conjugate side as a whole and a positive lens.

11. In a retro-focus type lens system divided into three lens units with respect to the widest air spacing and the next widest air spacing between adjacent lens units, and improvement comprising:
a first lens unit disposed on a long conjugate side and having a negative refractive power, and said first lens further comprises an aspherical lens provided with an aspherical surface on at least one surface thereof and meniscus-shaped negative doublet lens comprising a positive lens and a negative lens cemented together and having its convex surface facing a long conjugate side as a whole;
a second lens unit disposed subsequently to said first lens unit and provided with a positive lens block comprising a positive lens; and
a third lens unit disposed subsequently to said second lens unit and having a positive refractive power, and comprising a negative lens whose both lens surfaces are concave surfaces and two positive lenses.

12. In a retro-focus type lens system divided into three lens units with respect to the widest air spacing and the next widest air spacing between adjacent lens units, the improvement comprising:
a first lens unit disposed on a long conjugate side and having negative refractive power, and including a negative lens and an aspherical lens provided with aspherical surfaces or both lens surfaces thereof; and
a second lens unit disposed subsequently to said first lens unit and provided with a positive lens block; and
a third lens unit disposed subsequently to said second lens unit and having a positive refractive power, and including a negative lens and a positive lens;

wherein if quartic aspherical coefficients of aspherical surfaces which are adjacent to a first conjugate point side and a second conjugate point side, respectively, are B1 and B2, then B1>B2, and the shape of the aspherical surfaces is expressed by the following equation:

$$X = \frac{(1/R)H^2}{1 + \sqrt{1 - (H/R)^2}} + BH^4 + CH^6 + DH^8 + EH^{10}$$

where the x-axis is along the optical axis in the direction from the long-conjugate side, the H-axis is perpendicular to the x-axis and is taken through the vertex of the lens surface, and B, C, D and E are respective aspherical coefficients.

13. A projection lens, comprising:
first lens unit including a meniscus-shaped negative lens with a convex surface facing a first conjugate point side and an aspherical lens provided with an aspherical surface on at least one surface thereof; and
a second lens unit including a positive lens; and,
a third lens unit including a negative lens with both lens surfaces thereof being concave surfaces and two positive lenses; whereby a projection lens comprising 6 or 7 lens elements is defined.

14. A projection lens according to claim 13, wherein said second lens unit further comprises a positive lens block that is a positive lens or a doublet lens.

15. A projection lens according to claim 13, wherein the optical system satisfies the condition:

$$0.5 < |f_1/f_{23}| < 2.0$$

wherein $f_1$ is the focal length of said first lens unit and $f_{23}$ is the synthetic focal length of said second and third lens units.

16. A projection lens according to claim 13, wherein assuming a light flux is projected from the long conjugate side, the optical system satisfies the condition:

$$(D-h)/SK < 0.364$$

wherein D is maximum image height at an imaging plane, h is the height of a chief ray of the maximum off-axial light flux over the optical axis when the chief ray emerges from a rearmost lens adjacent to the imaging plane, and SK is a back focal length.

* * * * *

UNITED STATES PATENT AND TRADEMARK OFFICE
CERTIFICATE OF CORRECTION

PATENT NO. : 5,331,462
DATED : July 19, 1994
INVENTOR(S) : KOUTARO YANO

It is certified that error appears in the above-indentified patent and that said Letters Patent is hereby corrected as shown below:

ON COVER PAGE:

At [56] Under Heading "U.S. PATENT DOCUMENTS":
    Line 3, "3,832,035 7/1974 Takahashi" should read
    --3,832,035 8/1974 Takahashi--.

At [56] Under Heading "FOREIGN PATENT DOCUMENTS":
    Line 2, "314613 6/1991 Japan" should read
    --3-145613 6/1991 Japan--.

COLUMN 5:
    Line 29, "$\Delta V = \overline{h^3} \psi > 0$" should read --$\Delta V = h \overline{h^3} \psi < 0$--.

COLUMN 6:
    Line 61, "$|f_1 51|$" should read --$|f_1|$--.

COLUMN 7:
    Line 1, "$0.5 < |f_1/f_{23}| > 2.0$" should read
    --$0.5 < |f_1/f_{23}| < 2.0$--.

Line 43, "R12=-124.36" should read --R12=-124.26--.

UNITED STATES PATENT AND TRADEMARK OFFICE
CERTIFICATE OF CORRECTION

PATENT NO. : 5,331,462
DATED : July 19, 1994
INVENTOR(S) : KOUTARO YANO

It is certified that error appears in the above-indentified patent and that said Letters Patent is hereby corrected as shown below:

COLUMN 9:
    Line 37,  "it satisfies" should read --satisfying--.

COLUMN 10:
    Line 61,  "or" should read --on--.

Signed and Sealed this

Tenth Day of January, 1995

Attest:

BRUCE LEHMAN

Attesting Officer

Commissioner of Patents and Trademarks